United States Patent
An et al.

(10) Patent No.: US 7,759,012 B2
(45) Date of Patent: Jul. 20, 2010

(54) DIRECT METHANOL FUEL CELL SYSTEM AND OPERATING METHOD THEREOF

(75) Inventors: Jin Hong An, Yongin (KR); Ri A Ju, Yongin (KR); Hyun Kim, Yongin (KR); Dong Rak Kim, Yongin (KR); Jong Ki Lee, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 714 days.

(21) Appl. No.: 11/585,692

(22) Filed: Oct. 23, 2006

(65) Prior Publication Data
US 2007/0154754 A1    Jul. 5, 2007

(30) Foreign Application Priority Data
Jan. 5, 2006    (KR) .................. 10-2006-0001417

(51) Int. Cl.
*H01M 8/04* (2006.01)
(52) U.S. Cl. .................. 429/448; 429/408; 429/427; 429/428; 429/449
(58) Field of Classification Search .................. 429/22
See application file for complete search history.

(56) References Cited

U.S. PATENT DOCUMENTS

| | | | |
|---|---|---|---|
| 6,303,244 | B1 | 10/2001 | Surampudi et al. |
| 2002/0106542 | A1 | 8/2002 | Matejcck et al. |
| 2003/0157385 | A1 | 8/2003 | Bechmann et al. |
| 2004/0058220 | A1 | 3/2004 | Liu et al. |
| 2005/0053811 | A1* | 3/2005 | Acker et al. .................. 429/19 |
| 2005/0069739 | A1* | 3/2005 | Ozeki et al. .................. 429/22 |
| 2005/0214601 | A1* | 9/2005 | Shimizu et al. ............... 429/15 |

(Continued)

FOREIGN PATENT DOCUMENTS

JP    2003-331880    11/2003

(Continued)

OTHER PUBLICATIONS

European Search Report dated Apr. 23, 2007, for EP 07100012.9, in the name of Samsung SDI Co., Ltd.

(Continued)

*Primary Examiner*—Dah-Wei D Yuan
*Assistant Examiner*—Patricia Davis
(74) *Attorney, Agent, or Firm*—Christie, Parker & Hale, LLP

(57) ABSTRACT

A direct methanol fuel cell system includes a fuel cell main body including at least one membrane-electrode assembly having an electrolyte membrane, and an anode and a cathode positioned on opposite sides of the electrolyte membrane; a fuel-supplying unit feeding a mixing tank with high concentration fuel; the mixing tank mixing and storing the fuel fed from the fuel-supplying unit and an outlet stream discharged from the fuel cell main body; a fuel feeder supplying mixed fuel stored in the mixing tank to the fuel cell main body; and a controller controlling the fuel-supplying unit to stop operating in response to a stop request signal, and controlling the fuel feeder to operate to circulate the mixed fuel via the anode of the fuel cell main body until a fuel concentration of the mixed fuel is less than or equal to a reference concentration.

14 Claims, 8 Drawing Sheets

U.S. PATENT DOCUMENTS

2005/0238932 A1 10/2005 Koyama et al.
2006/0003200 A1* 1/2006 Ozeki et al. .................. 429/14

FOREIGN PATENT DOCUMENTS

| JP | 2004-95376 | 3/2004 |
| JP | 2004-214004 | 7/2004 |
| JP | 2005-294065 | 10/2005 |

OTHER PUBLICATIONS

Patent Abstract of Japan No. 2004-095376, Published on Mar. 25, 2004, in the name of Muramatsu Yasuyuki.
Patent Abstract of Japan No. 2004-214004, Published Jul. 29, 2004, in the name of Takashita Masahiro et al.
Japanese Office action dated Dec. 1, 2009, for corresponding Japanese application 2006-103439, noting listed references in this IDS, as well as JP 2004-214004, previously filed in an IDS dated Oct. 23, 2006.

* cited by examiner

DIRECT METHANOL FUEL CELL SYSTEM AND OPERATING METHOD THEREOF

CROSS-REFERENCE TO RELATED APPLICATIONS

This application claims priority to and the benefit of Korean Patent Application No. 10-2006-0001417, filed on Jan. 5, 2006, in the Korean Intellectual Property Office, the entire content of which is incorporated herein by reference.

BACKGROUND

A polymer electrolyte membrane fuel cell (PEMFC) includes a stack, a reformer, a fuel tank, and a fuel pump. In the PEMFC, the fuel in the fuel tank is supplied to the reformer by an operation of the fuel pump. The reformer reforms the fuel to generate hydrogen gas. The stack causes the hydrogen gas supplied from the reformer and oxygen to electrochemically react with each other to generate electric energy.

A direct methanol fuel cell (DMFC) is similar to the PEMFC, but the DMFC can directly supply liquid methanol fuel to its stack. Since the DMFC does not need to use the reformer that is in the PEMFC, the DMFC can be small in size.

The DMFC is provided with a membrane-electrode assembly that includes a polymer electrode membrane, and anode and cathode electrodes attached to the opposite sides of the polymer electrode membrane. Further, the DMFC can include a separator to form a stack. In a DMFC stack, tens to hundreds of membrane-electrode assemblies, in which an electrochemical reaction arises, are stacked, and opposite end plates are compressed by a coupling bar, air pressure or the like to reduce contact resistance between component elements.

A DMFC system includes a device to support and control an operation of the DMFC stack. Such a device generally includes an auxiliary component (balance of plant: BOP). The balance of plant can include a reactant supply to serve fuel and an oxidant; a controller to control the system; a power converter; a temperature adjuster; a humidifier; a sensor; a monitoring device; etc.

Also, the DMFC system includes an electricity storage device that includes at least one of a battery, a super capacitor, etc. and a controller to control it to be charged and discharged; and various electric devices that operate by the electric energy. The electric devices include a blower, a pump, a compressor, a regulator, a sensor, a powered valve, an electronic device, an electronic circuit, etc. These electric devices operate by receiving power from a commercial power source or the electricity storage device before receiving the power from the DMFC system.

The DMFC has a problem, however, in that a catalyst may be poisoned by carbon monoxide (CO) generated when unreacted fuel remaining in the anode moves to the cathode via the electrolyte membrane and reacts with oxygen in a cathode catalyst layer because the fuel remains in a fuel cell main body having a structure, such as an active type stack, a semi-passive type cell pack or the like when the fuel cell system stops operating. Further, the fuel remaining in the anode includes carbon dioxide generated by reaction in the anode, so that carbon dioxide can have an adverse effect on the membrane-electrode assembly. Most of the polymer electrolyte membranes, which have recently been widely used, greatly expand while being dipped in methanol. Therefore, in the case where the DMFC system stops operating while the methanol supplied as the fuel remains in the fuel cell main body, the electrolyte membrane is damaged. Further, when the DMFC system is restarted in this state, the performance of the system is largely deteriorated and the lifetime of the fuel cell is notably shortened. To prevent the membrane-electrode assembly from corrosion and damage, there is conventional technology to discharge or exhaust the methanol fuel remaining in the fuel cell main body.

For example, the DMFC system stops supplying the liquid fuel such as methanol to the stack when it stops operating; supplies an oxidant to the stack for a predetermined period; and stops supplying the oxidant after exhausting the remaining fuel. However, the conventional driving method is performed only when the molar concentration of methanol ranges from 1 M to 6 M. Therefore, in the conventional driving method, the membrane-electrode assembly is still likely to be corroded or damaged by the fuel remaining in the stack.

Thus, in the conventional DMFC system cycling between operation and a stop in operation (a "stop"), as the frequency that the DMFC system stops increases, the performance of the stack decreases, as shown in FIG. 1.

SUMMARY

A direct methanol fuel cell system includes a fuel cell main body including at least one membrane-electrode assembly having an electrolyte membrane, and an anode and a cathode positioned on opposite sides of the electrolyte membrane; a fuel-supplying unit feeding a mixing tank with high concentration fuel; the mixing tank mixing and/or storing the fuel fed from the fuel-supplying unit and an outlet stream discharged from the fuel cell main body; a fuel feeder supplying mixed fuel stored in the mixing tank to the fuel cell main body; and a controller controlling the fuel-supplying unit to stop operating in response to a stop request signal, and controlling the fuel feeder to operate to circulate the mixed fuel via the anode of the fuel cell main body until a fuel concentration of the mixed fuel is less than or equal to a reference concentration.

The mixed fuel may be a methanol solution, and the reference concentration may range from 0 to 0.3 M. One embodiment also includes a concentration sensor to detect the fuel concentration of the mixed fuel. A timer may also be included that is set to operate for a time taken to lower the fuel concentration of the mixed fuel to less than or equal to the reference concentration, the timer stopping the fuel feeder when the timer stops operating. The timer may operate in response to the stop request signal.

Another embodiment also includes a soft switch type stop button generating the stop request signal, wherein the controller is adapted to receive the stop request signal from the soft switch type stop button and to control the fuel-supplying unit to stop operating in response to the stop request signal. The soft switch type stop button may be coupled to an external load.

The at least one membrane-electrode assembly may be a plurality of membrane-electrode assemblies, and the fuel cell main body may include a separator electrically connecting the plurality of membrane-electrode assemblies in series and defining a channel allowing a fluid flow.

Another embodiment includes an oxidant-supplying unit to feed the fuel cell main body with an oxidant. The controller controls the oxidant-supplying unit to stop operating at or after a time when the fuel feeder stops operating. The fuel cell main body may employ air contacting the cathode as an oxidant.

An electricity storage device may be electrically connected to the fuel cell main body, the fuel-supplying unit, the fuel feeder, and the controller. The controller may control the electricity storage device to be charged with electricity generated in the fuel cell main body.

A switching unit may electrically disconnect an external load from the fuel cell main body, and electrically connect the electricity storage device with the fuel cell main body.

A method of operating a direct methanol fuel cell system similar to that described above includes receiving a stop request signal for stopping the direct methanol fuel cell system; and controlling the fuel-supplying unit to stop operating in response to the stop request signal, and controlling the fuel feeder to operate to circulate the mixed fuel via an anode of the fuel cell main body until a fuel concentration of the mixed fuel is less than or equal to a reference concentration. The mixed fuel may be a methanol solution, and the reference concentration may range from 0 to 0.3 M. The method may also include sensing the fuel concentration of the mixed fuel, and operating a timer for a time taken to lower the fuel concentration of the mixed fuel to less than or equal to the reference concentration, and stopping the fuel feeder when the timer stops operating. The operating the timer may include operating the timer in response to the stop request signal. The receiving the stop request signal may include receiving a signal generated by a soft switch type stop button coupled to the direct methanol fuel cell system or an external load. An electricity storage device may also be controlled to be charged with electricity generated in the fuel cell main body, and an oxidant-supplying unit feeding the fuel cell main body with an oxidant can be stopped at or after a time when the fuel feeder stops operating.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive.

Figure 1:
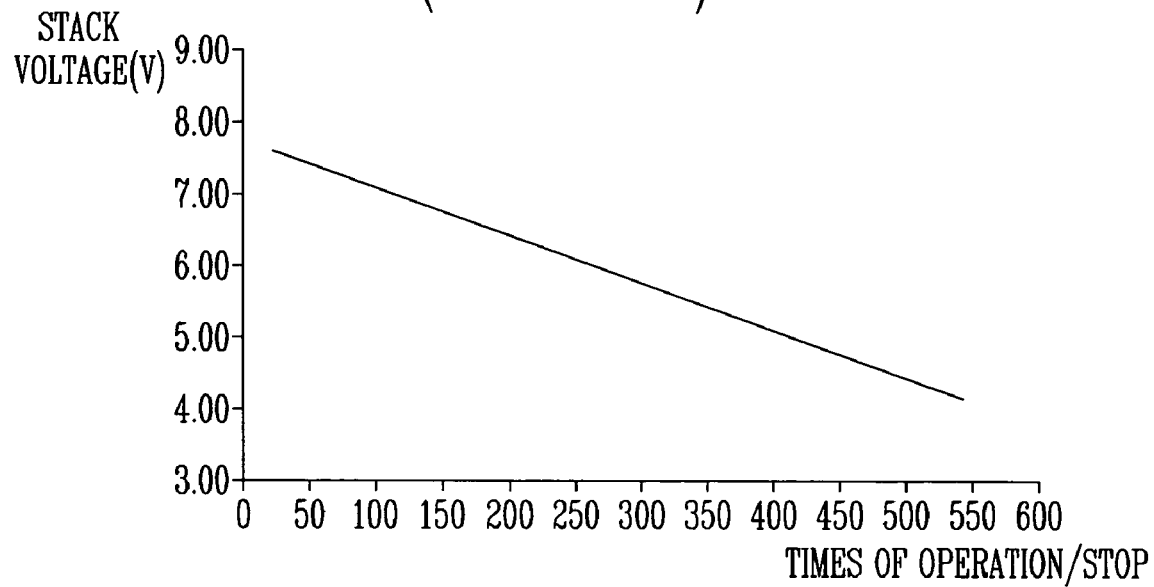
FIG. 1 is a graph showing performance deterioration of a conventional direct methanol fuel cell system as the system operates in a cycle between an operation and a stop.
Figure 2:
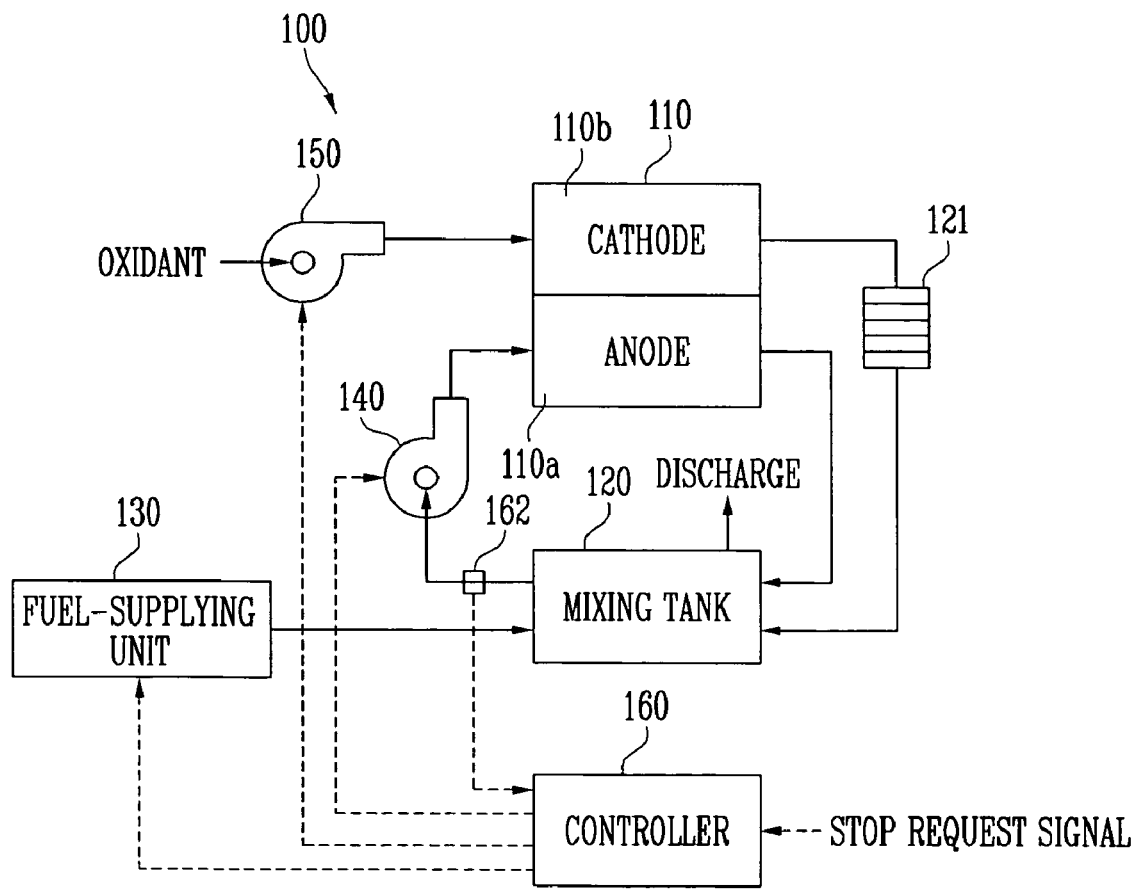
FIG. 2 is a block diagram of a direct methanol fuel cell system according to a first embodiment of the present invention.

Referring to FIG. 2, a DMFC system 100 according to a first embodiment of the present invention includes a fuel cell main body 110, a mixing tank 120, a fuel-supplying unit 130, a fuel feeder 140, an oxidant-supplying unit 150, and a controller 160.

The fuel cell main body 110 causes fuel supplied to an anode 110a to electrochemically react with an oxidant supplied to a cathode 110a, thereby generating electricity and heat. The fuel cell main body 110 includes an ion exchange membrane (not shown) to electrically separate the anode 110a from the cathode 110b, and selectively transmit protons of the fuel from the anode 110a to the cathode 110b. Further, the fuel cell main body 110 includes an anode inlet to introduce the fuel to the anode 110a; an anode outlet to discharge a reaction product such as unreacted fuel, carbon dioxide, etc. from the anode 110a; a cathode inlet to introduce an oxidant to the cathode 110b; and a cathode outlet to discharge a reaction product such as an unreacted oxidant, water, etc. from the cathode 110b.

The mixing tank 120 supplies the mixed fuel to the anode 110a of the fuel cell main body 110. Further, the mixing tank 120 stores high concentration fuel received from the fuel-supplying unit 130, and stores the unreacted fuel and water recovered from the fluid discharged through the anode outlet and the cathode outlet of the fuel cell main body 110. In this embodiment, the mixing tank 120 is connected to a heat exchanger 121 to intercept heat energy of the fluid discharged from the fuel cell main body 110. The mixing tank 120 is provided with a discharging hole to discharge undesired gas of the fluid. The mixing tank 120 may include a recycling unit having various well-known shapes and structures.

Because the ion exchange membrane used in the fuel cell main body 110 transmits a predetermined amount of the fuel supplied to the anode 110a toward the cathode 110b, the mixed fuel has concentration to properly reduce the amount of the fuel passing through the ion exchange membrane in consideration of the performance loss due to fuel oxidation in the cathode. Typically, the concentration of the mixed fuel, e.g., methanol solution, ranges from 0.5 M through 6 M.

The fuel-supplying unit 130 supplies the high concentration fuel to the mixing tank 120. The fuel-supplying unit 130 includes a means for storing the fuel, and a means for controlling the amount of the fuel supplied to the mixing tank 120. The means for storing the fuel can be implemented by a fuel tank, and the means for controlling the amount of the fuel can be implemented by a pump, a compressor, or a dynamic valve. The high concentration fuel includes methanol solution having a concentration of 6 M or more or pure methanol.

The fuel feeder 140 supplies the mixed fuel stored in the mixing tank 120 to the anode 110a of the fuel cell main body 110. The fuel feeder 140 controls the amount of the mixed fuel to be supplied. Further, the fuel feeder 140 circulates the mixed fuel via the anode 110a when the system stops operating. Here, the fuel feeder 140 can be implemented by a pump or a compressor.

The oxidant-supplying unit 150 supplies the oxidant to the cathode 110b of the fuel cell main body 110. In one embodiment, the oxidant includes a material, i.e. an air including oxygen, pure oxygen or the like, which properly reduces the hydrogen in the cathode 110b, but does not produce a material harmful to a human body or an environment. Here, the oxidant-supplying unit 150 can be implemented by an air pump or an air blower.

When the controller 160 receives a stop request signal for stopping the system, the controller 160 controls an operation of the fuel-supplying unit 130 to stop the high concentration fuel being supplied to the mixing tank 120, and controls an operation of the oxidant-supplying unit 150 to supply a predetermined amount of oxidant to the fuel cell main body 110. Then, the controller 160 controls an operation of the fuel feeder 140 to circulate the mixed fuel stored in the mixed tank 120 via the anode 110a of the fuel cell main body 110. In this case, the controller 160 senses the concentration of the mixed fuel by the concentration sensor 162, and controls an operation of the fuel feeder 140 until the mixed fuel supplied to the anode 110a has a reference concentration, e.g., 0.3 M and below in the case of the methanol solution. Here, the controller 160 can be implemented by a simple logic circuit using a flip-flop, or a partial function unit of a high performance microprocessor for system control.

Limiting the concentration of the mixed fuel to the reference concentration (0.3 M in the case of the methanol solution) and below may avoid adverse effects, such as the activity deterioration of metal catalyst, and the damage in the electrolyte membrane, etc. in the fuel cell main body. In addition, a time taken to stop the operation of the system is shortened, and a time taken to restart the system is slightly shortened with the remaining fuel having a concentration of 0.3 M and below.

An operating method for the foregoing DMFC system will now be described with reference to FIG. 3, wherein a flowchart shows the operation of the direct methanol fuel cell system according to the first embodiment of the present invention.

Figure 3:
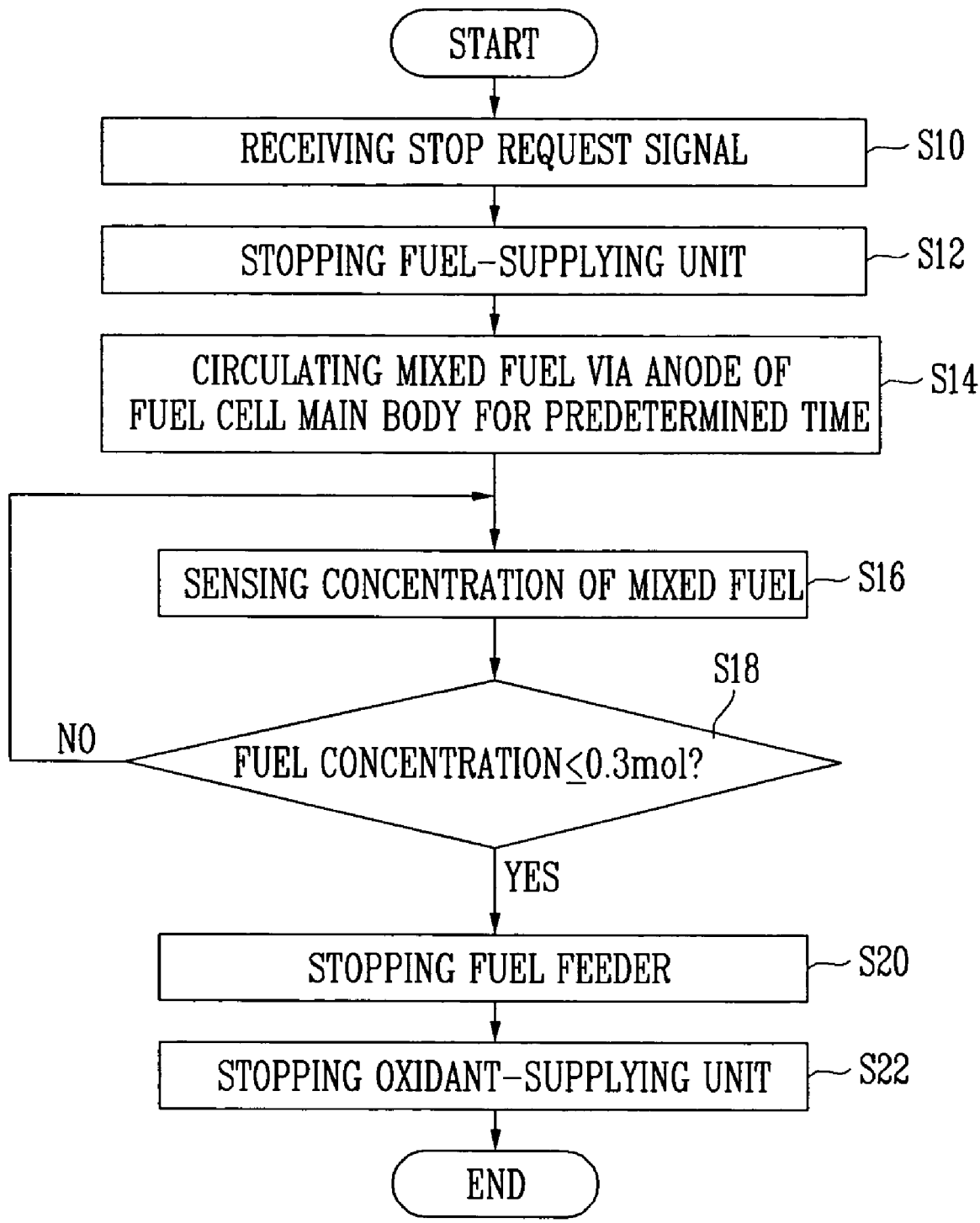
FIG. 3 is a flowchart showing operation of the direct methanol fuel cell system according to the first embodiment of the present invention.

Referring to FIG. 3, a controller of the DMFC system receives a stop request signal for stopping the system (S10). Then, the controller stops the fuel-supplying unit (S20). Further, the controller controls the fuel feeder to circulate the mixed fuel stored in the mixing tank via the anode of the fuel cell main body (S14). concentration Then, the controller senses the concentration of the mixed fuel by the concentration sensor (S16). Further, the controller determines whether the sensed concentration is 0.3 M or below (S18). When the sensed concentration is not less than or equal to 0.3 M, the controller repeatedly senses the concentration of the mixed fuel at predetermined intervals, and determines whether the sensed concentration is less than or equal to 0.3 M. In the case where a predetermined time elapses in the state that the sensed concentration is not less than or equal to 0.3 M, the controller may give a system warning.

On the other hand, when the sensed concentration is less than or equal to 0.3 M, the controller controls the fuel feeder to stop operating (S20). Further, the controller controls the oxidant-supplying unit to stop operating (S22).

Figure 4:
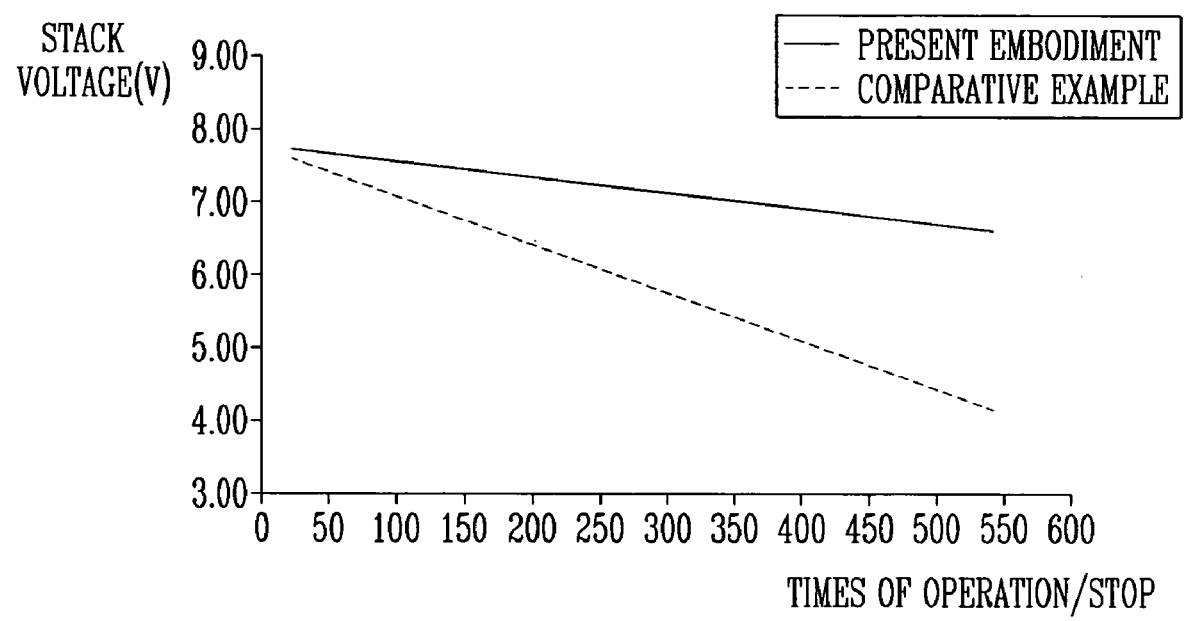
FIG. 4 is a graph showing a performance change of the direct methanol fuel cell system according to the first embodiment of the present invention.

FIG. 4 is a graph showing a performance change of the direct methanol fuel cell system according to the first embodiment of the present invention. A cycle between the operation and the stop is repeated about 500 times. The output voltage of the DMFC stack according to a comparative example is relatively rapidly decreased from about 7.6V to 4.6V as the cycle between the operation and the stop is repeated. As compared with the comparative example, the output voltage of the DMFC stack according to the present invention is relatively smoothly decreased from about 7.6V to 7.0V as the cycle between the operation and the stop is repeated.

Thus, in the DMFC system according to this embodiment of the present invention and the operating method thereof, the concentration of the fuel remaining in the anode when the system stops operating is simply decreased into a desired concentration, so that not only the activity deterioration of the electrode catalyst and the damage in the electrolyte membrane are prevented while the system is stopped, but also the performance level of the system is not lowered when the system is restarted.

Figure 5:
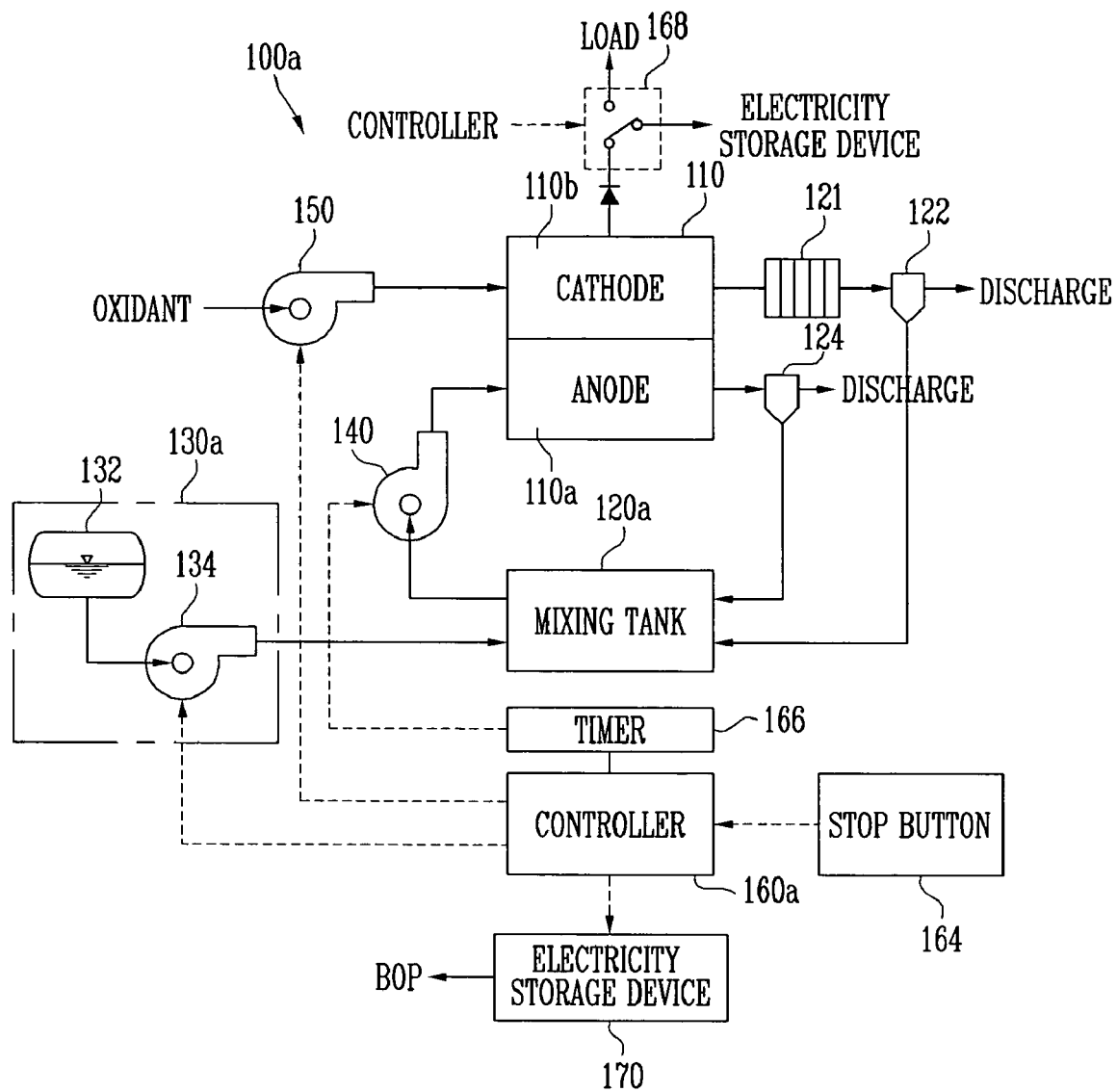
FIG. 5 is a block diagram of a direct methanol fuel cell system according to a second embodiment of the present invention.

FIG. 5 is a block diagram of a direct methanol fuel cell system according to a second embodiment of the present invention. A DMFC system 100a includes a fuel cell main body 110, a mixing tank 120a, a fuel-supplying unit 130a, a fuel feeder 140, an oxidant-supplying unit 150, a controller 160a, a stop button 164, a timer 166, a switching unit 168, and an electricity storage device 170.

The DMFC system 100a of the second embodiment is substantially similar to that of the first embodiment. The DMFC system 100a according to the second embodiment internally circulates the mixed fuel for a sufficient time without using a separate concentration sensor to sense the concentration of the mixed fuel, thereby lowering the concentration of the mixed fuel to a reference concentration or below.

For reference, in the detailed description below, like numerals refer to like elements between the first and second embodiments, and repetitive descriptions will be avoided.

The mixing tank 120a stores unreacted fuel and water discharged from the fuel cell main body 110 and separated/recovered by a heat exchanger 121 and first and second traps 122 and 124. Further, the mixing tank 120a receives the high concentration fuel stored in a fuel tank 132 by an operation of a fuel pump 134.

The heat exchanger 121 can be implemented by various well-known means as long as it can intercept heat energy from fluid discharged from the fuel cell main body 110. For example, the heat exchanger 121 is implemented by a fan or a cooler to lower the temperature of a pipe through which the fluid such as water vapor or the like passes, thereby transforming the water vapor into water.

The first trap 122 extracts undesired gaseous components such as air or the like from crossover liquid fuel or water in a cathode outlet stream discharged from a cathode outlet. The second trap 124 extracts undesired gaseous components such as carbon dioxide or the like from the unreacted fuel and water in an anode outlet stream discharged from an anode outlet.

The controller 160a receives a signal generated when the stop button 164 is pushed, and recognizes the received signal as a stop request signal, thereby performing a serial process based on a preset stop routine. The controller 160a stops the fuel-supplying unit 130a to prevent the high concentration fuel from being supplied to the mixing tank 120a. Further, the controller 160a controls the timer 166 to operate. Further, the controller 160a controls the switching unit 168 to charge the electricity storage device 170 with electricity generated in the fuel cell main body 110.

The stop button 164 is automatically or manually operated, and generates a signal for stopping the DMFC system. The stop button 164 is provided in the DMFC system to be stopped, or provided in an external load or application using the electricity of the DMFC system. To perform the stop routine, the stop button 164 may be provided as a soft switch type, which does not perfectly stop the DMFC system and generates a predetermined signal to be recognized by the controller 160a.

The timer 166 is set to operate with enough time to decrease the concentration of the mixed fuel circulated from the mixing tank 120a via the anode 110a of the fuel cell main body 110 into the reference concentration when the DMFC system stops operating. Further, the timer 166 is used to stop the operation of the fuel feeder 140 when the system stops operating. Here, the timer 166 can be implemented by various well-known timers that operate in response to the stop request signal from the stop button 164 or the controller 160a. Also, the timer 166 can be implemented by a timer that counts a delay time on the basis of clocks from a microprocessor chip used as a partial function unit of the controller 160a.

The switching unit 168 electrically connects the fuel cell main body 110 with the electricity storage device 170 in response to a control signal from the controller 160a when the system stops operating, so that the electricity storage device 170 is charged with the electricity generated by the fuel cell main body 110. Further, the switching unit 168 electrically disconnects the fuel cell main body 110 from an external load, so that the whole electricity produced in the fuel cell main body 110 is charged in the electricity storage device 170 when the amount of electricity charged in the electricity storage device 170 is small. The controller 160a prevents the electricity storage device 170 from an overcharge. In the case of a secondary battery, the controller 160a may control the secondary battery to be charged at a state of charge (SOC) of 100%. Further, the controller 160a controls the electricity remaining after charging the electricity storage device 170 to be effectively consumed through an auxiliary component (balance of plant) such as a fuel pump or the like.

The electricity storage device 170 includes a rechargeable battery, a super capacitor, etc. that is rechargeable. While the system operates, the electricity storage device 170 supplies power to the balance of plants such as the fuel-supplying unit 130a, the fuel feeder 140, the oxidant 150, the controller 160a, or the like. Further, the electricity storage device 170 is electrically connected to the fuel cell main body 110, and charged with the electric energy produced in the fuel cell main body 110 when the system stops operating.

The controller 160a controls the fuel-supplying unit 130 to stop operating, controls the fuel feeder 140 to operate for a predetermined time, and controls the oxidant-supplying unit 150 to operate for a predetermined time on the basis of time counted by the timer 166. In this case, the timer 166 may be provided with switching contact points or may be connected to another switching unit separated from the switching unit 168, so that the fuel-supplying unit 130 stops operating when the timer 166 changes to an ON-state and the fuel feeder 140 and the oxidant-supplying unit 150 stop operating when the timer 166 changes to an OFF-state.

Figure 6:
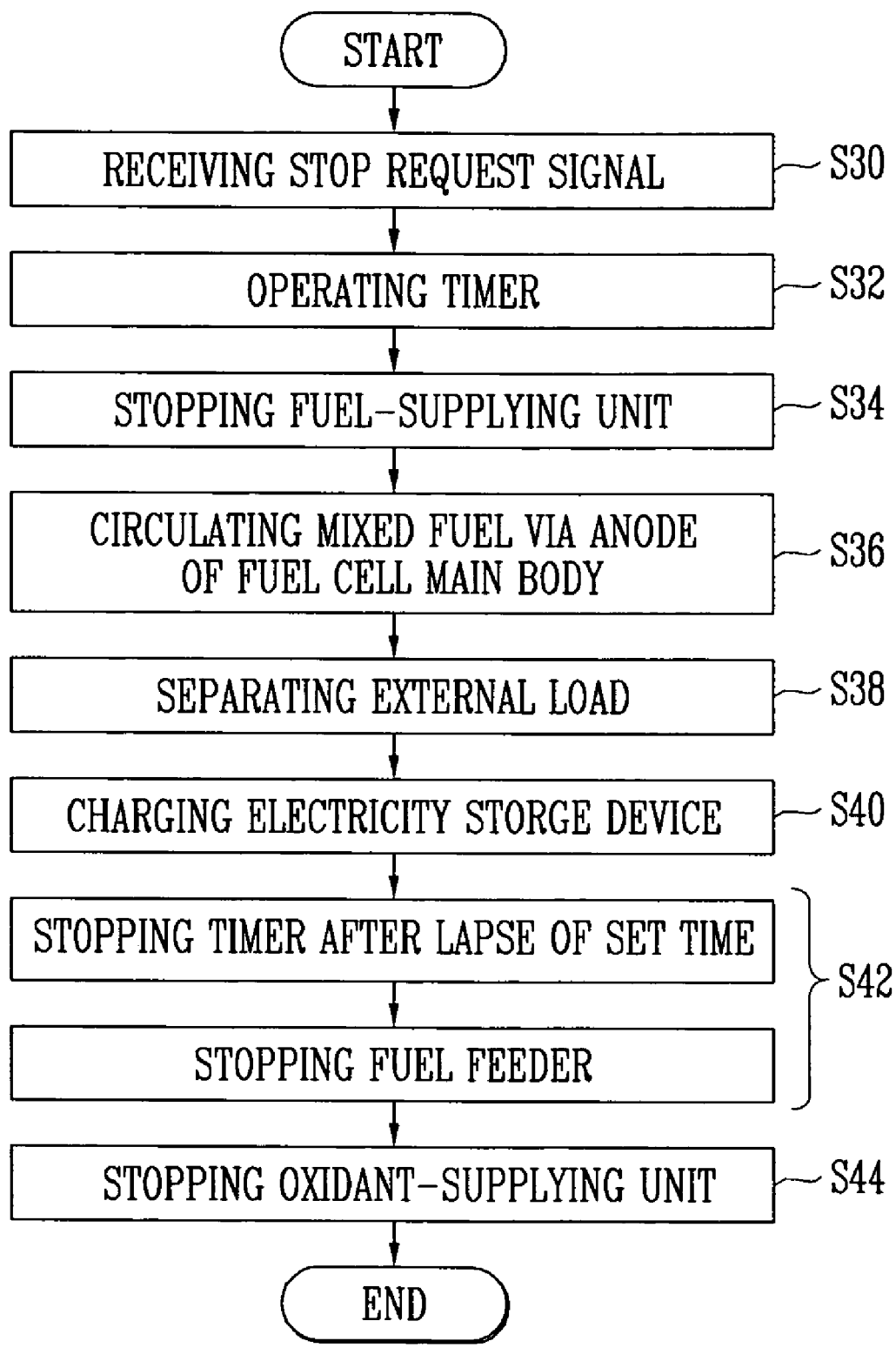
FIG. 6 is a flowchart showing operation of the direct methanol fuel cell system according to the second embodiment of the present invention.

FIG. 6 is a flowchart showing the operation of the direct methanol fuel cell system according to the second embodiment of the present invention. The controller of the DMFC system receives a stop request signal for stopping the system (S30). Then, the controller controls the timer to start operating (S32). Further, the controller stops the fuel-supplying unit (S34). Also, the controller controls the fuel feeder to circulate the mixed fuel stored in the mixing tank via the anode of the fuel cell main body (S36).

Then, the controller electrically disconnects the external load from the fuel cell main body (S38). Then, the controller electrically connects the electricity storage device with the fuel cell main body, and charges the electricity storage device with the electric energy produced in the fuel cell main body when the system stops operating (S40).

When the timer stops counting time after the lapse of a preset time, the fuel feeder stops operating (S42). Further, the controller controls the oxidant-supplying unit to stop operating (S44).

In the second embodiment, while the DMFC system stops operating, the mixed fuel is circulated via the anode for a predetermined time based on the timer. Therefore, not only the activity deterioration of a metal catalyst and the damage in the electrolyte membrane are prevented while the DMFC system is stopped, but also the electric energy requested when the system is restarted is effectively stored in the electricity storage device.

Figure 7:
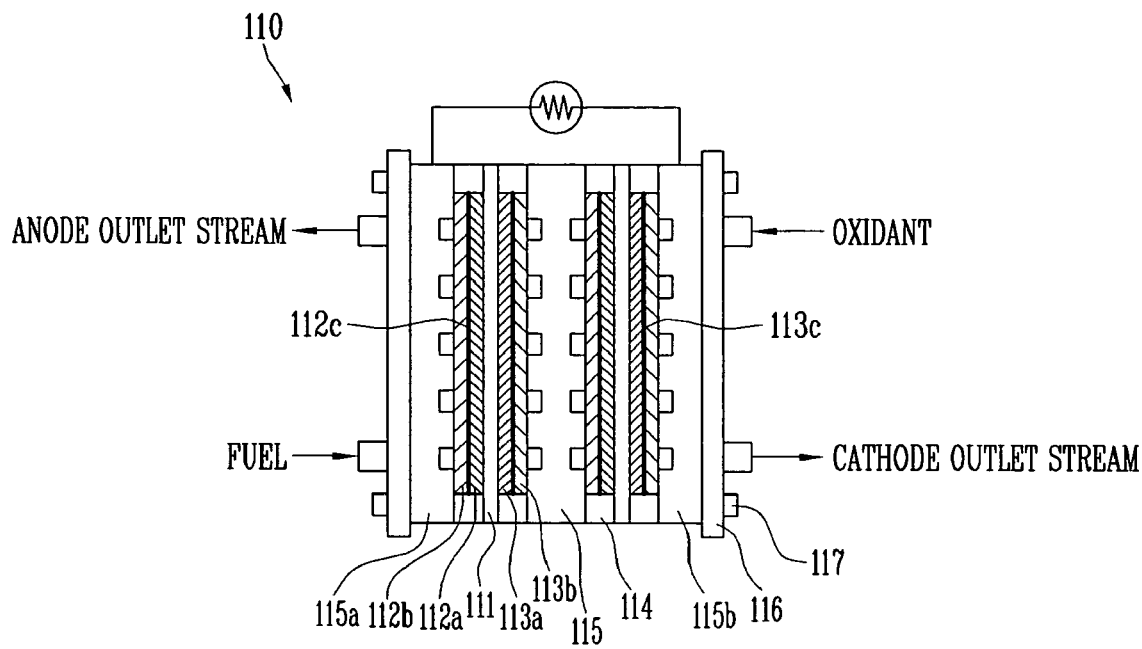
FIG. 7 is a schematic view of one embodiment of a fuel cell main body employed in the direct methanol fuel cell system according to the first and second embodiments of the present invention.

FIG. 7 is a schematic view of a fuel cell main body employed in the direct methanol fuel cell system according to the first and second embodiments of the present invention. A fuel cell main body 110 includes a plurality of membrane-electrode assemblies (MEAs), each of which has an electrolyte membrane 111 and an anode and a cathode placed in opposite sides of the electrolyte membrane 111; and a separator connecting the plurality of MEAs in series and supplying fuel and an oxidant to the anode and the cathode, respectively. Further, the fuel cell main body 110 includes a gasket 114 placed between the electrolyte membrane 111 and the separator; a pair of end plates 116 applying a predetermined coupling pressure to a stacked structure of the MEA and the separator; and a coupling means 117 coupling the pair of end plates 116.

The MEA induces an oxidation reaction of the fuel and a reduction reaction of the oxidant, thereby generating electric energy. The anode includes a catalyst layer 112a to transform the fuel into electrons and hydrogen ions by the oxidation reaction; and a diffusing layer 112b to smoothly transfer the fuel, carbon dioxide, and the electrons. The cathode includes a catalyst layer 113a to promote reaction of the hydrogen ions transferred from the anode with the oxidant; and a diffusing layer 113b to smoothly move air and discharge produced water. Here, the electrolyte membrane 111 includes a solid polymer electrolyte having a thickness of 50-200 $\mu$m, and has an ion exchange function to transfer the hydrogen ions produced in the catalyst layer 112a of the anode to the catalyst layer 113a of the cathode. Further, the diffusing layers 112b and 113b of the anode and the cathode can be coated with microporous layers 112c and 113c to very smoothly supply the fuel or the oxidant to the catalyst layer 112a and 113a.

The electrolyte membrane 111 preferably includes one or more hydrogen ion conductive polymers selected from a group consisting of perfluoride polymer, benzimidazole polymer, polyimide polymer, polyetherimide polymer, polyphenylenesulfide polymer, polysulfone polymer, polyethersulfone polymer, polyetherketone polymer, polyether-etherketon polymer, and polyphenylquinoxaline polymer. More preferably, the electrolyte membrane 111 includes one or more hydrogen ion conductive polymers selected from a group consisting of poly(perfluorosulfone acid), poly(perfluorocarboxyl acid), copolymer of fluorovinylether and tetrafluoroethylene including sulfone acid, defluoride polyetherketon sulfide, aryl ketone, poly(2,2'-(m-phenylene)-5, 5'-bibenzimidazole) and poly(2,5-benzimidazole).

One embodiment of the catalyst layer 112a, 113a includes one or more metal catalysts selected from a group of transition metals, such as platinum, ruthenium, osmium, platinum-ruthenium alloy, platinum-osmium alloy, platinum-palladium alloy, and platinum-M alloy (where, M includes Ga, Ti, V, Cr, Mn, Fe, Co, Ni, Cu and Zn), or a combination thereof. Further, the catalyst layer 112a, 113a may include one or more metal catalysts selected from a group consisting of platinum deposited on supports, ruthenium, osmium, platinum-ruthenium alloy, platinum-osmium alloy, platinum-palladium alloy, and platinum-M alloy (where, M includes one or more transition metals selected from a group consisting of Ga, Ti, V, Cr, Mn, Fe, Co, Ni, Cu and Zn). Here, the supports can include any material as long as it is conductive. In one embodiment, the supports include carbon.

The diffusing layer 112b, 113b is used for diffusing the fuel, water and air uniformly; collecting generated electricity; and protecting the catalyst layer 112a, 113a from loss by the fluid. The diffusing layer 112b, 113b can be implemented by carbon materials such as carbon cloth, carbon paper, or the like.

Some embodiments of the microporous layer 112c, 113c include one or more carbon materials selected from a group consisting of graphite, carbon nano-tube (CNT), fullerene (C60), activated carbon, Vulcan, ketchen black, carbon black, and carbon nano-horn. Further, the microporous layer 112c, 113c can include one or more binders selected from a group consisting of poly(perfluorosulfone acid), poly(tetrafluoroethylene) and fluorinated ethylene-propylene.

The separator is used as not only a conductive body to electrically connect the neighboring membrane-electrode assemblies in series but also a passage through which the fuel and the oxidant needed for the oxidation and reduction reactions of the membrane-electrode assembly are supplied to the anode and the cathode, respectively. Further, the separator includes an anode mono plate 115a, a cathode mono plate 115b, and at least one bipolar plate 115 in which the anode mono plate 115a and the cathode mono plate 115b are coupled.

The gasket 114, the end plate 116, and the coupling means 117 are used to airtightly couple the stacked structure of the membrane-electrode assembly and the separator, and they can have various well-known materials, shapes and structures.

Figure 8:
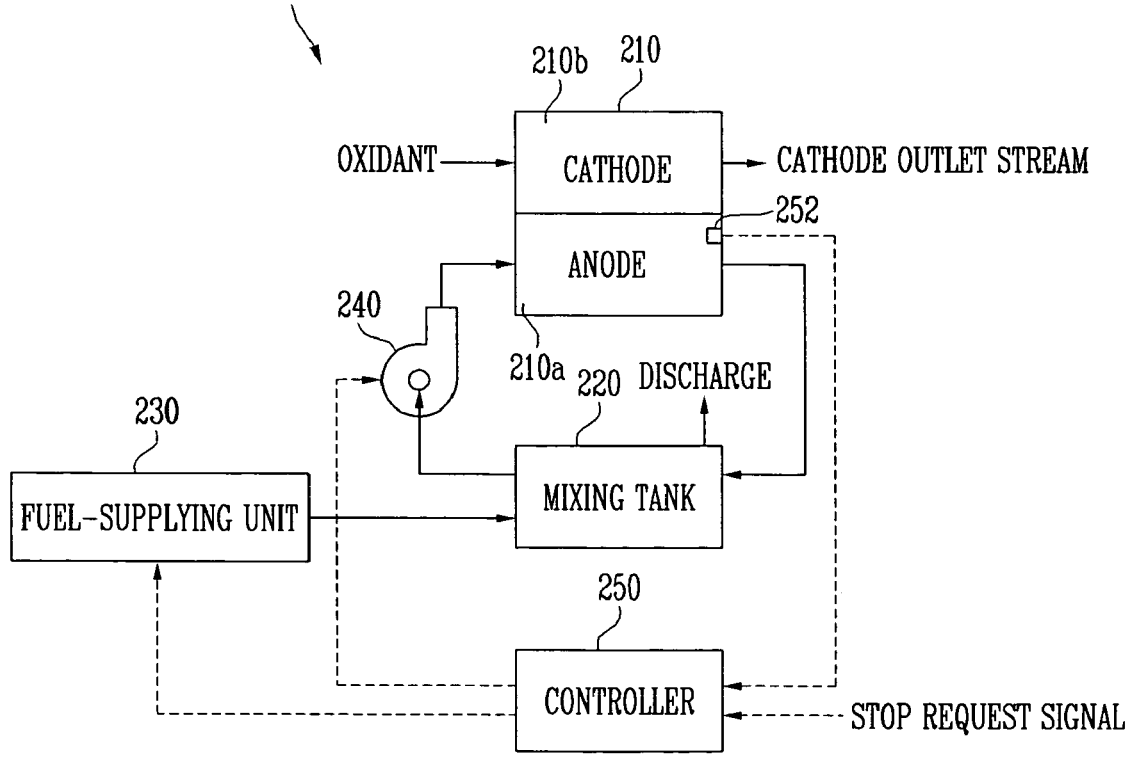
FIG. 8 is a block diagram of a direct methanol fuel cell system according to a third embodiment of the present invention.

FIG. 8 is a block diagram of a direct methanol fuel cell system according to a third embodiment of the present invention. A DMFC system 200 includes a fuel cell main body 210, a mixing tank 220, a fuel-supplying unit 230, a fuel feeder 240, and a controller 250.

Contrary to the DMFC systems according to the first and second embodiments, the DMFC system according to the third embodiment of the present invention supplies air or an oxidant to a cathode 210b of the fuel cell main body 210 without using an oxidant-supplying unit such as the pump, the fan or the like.

An anode 210a of the fuel cell main body 210 according to the third embodiment of the present invention receives mixed fuel from the mixing tank 220 through the fuel feeder 240, and discharges diluted fuel solution (unreacted fuel and water) toward the mixing tank 220. For this, an inlet and an outlet of the anode 210a is coupled to the mixing tank 220, and configured to circulate the mixed fuel from the mixing tank 220 via the anode 210a when the system stops operating. Further, the cathode 210b has a structure for facilitating air contact of the cathode 210b and smoothly discharging water produced in the cathode 210b. With this configuration, the fuel supplied to the anode 210a electrochemically reacts with the oxidant introduced into the cathode 210b in the fuel cell main body 210, thereby generating electricity and heat.

The fuel-supplying unit 230, the fuel feeder 240 and the controller 250 are substantially the same as those according to the first or second embodiments.

The controller 250 senses the concentration of the mixed fuel by a concentration sensor 252 when the DMFC system receives a stop request signal. On the basis of the sensed concentration of the mixed fuel, the controller 250 controls the fuel-supplying unit 230 to stop operating and the fuel feeder 240 to operate so as to circulate the mixed fuel via the anode 210a for a predetermined time, thereby finally causing the concentration of the mixed fuel remaining in the anode 210a to have the reference concentration or below, e.g., 0 to 0.3 M in the case of the methanol solution. The concentration sensor 252 may be inserted in a manifold near the anode outlet.

Figure 9:
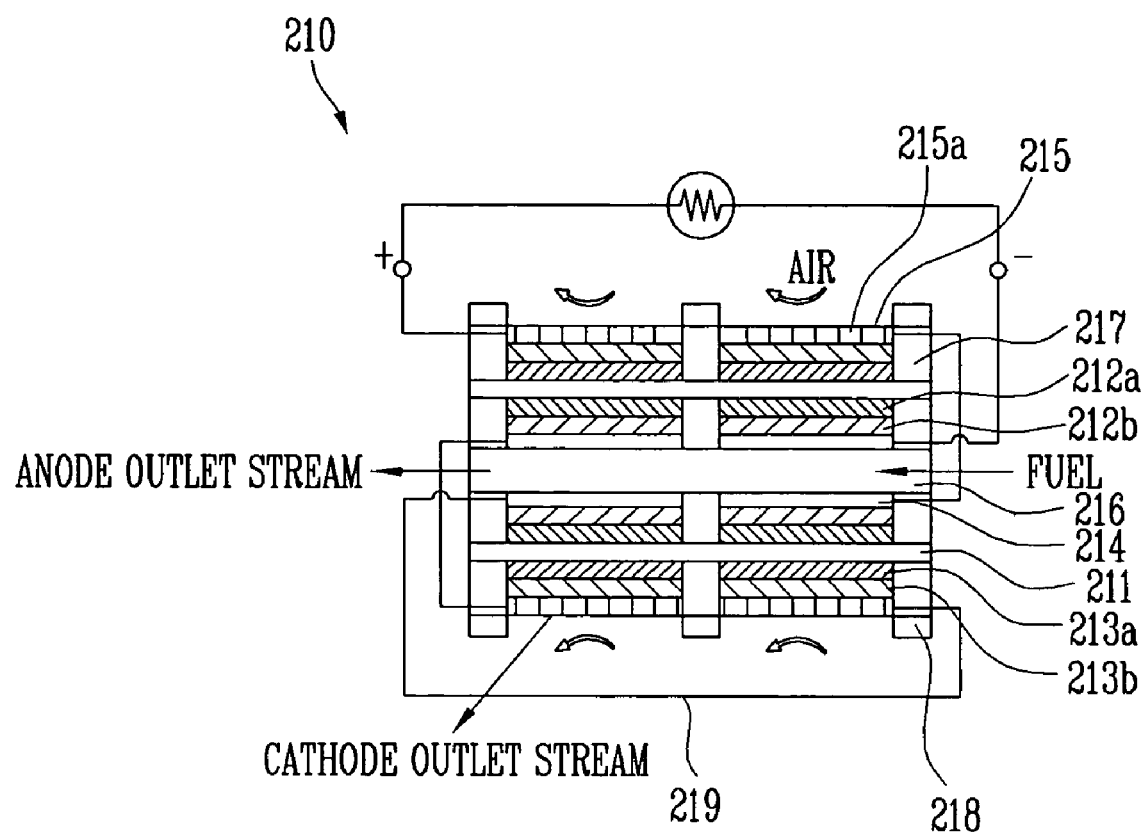
FIG. 9 is a schematic view of one embodiment of a fuel cell main body employed in the direct methanol fuel cell system according to the third embodiment of the present invention.

FIG. 9 is a schematic view of a fuel cell main body employed in the direct methanol fuel cell system according to the third embodiment of the present invention. A fuel cell main body 210 includes an electrolyte membrane 211, an anode provided with a catalyst layer 212a and a diffusing layer 212b, a cathode provided with a catalyst layer 213a and a diffusing layer 213b, an anode collector 214, a cathode collector 215, a middle plate 216, a gasket 217, an end plate 218, and a wiring line 219. Further, the fuel cell main body 210 includes four membrane-electrode assemblies connected in series with the wiring line 219.

The middle plate 216 is provided with an inlet and an outlet through which the fuel is introduced and discharged; a manifold for allowing a flow of the fuel; and a plurality of holes to supply the fuel. The opposite sides of the middle plate 216 are adjacent to the membrane-electrode assemblies. Each membrane-electrode assembly includes the electrolyte membrane 211 and the anode and the cathode placed in the opposite sides of the electrolyte membrane 211.

The anode collector 214 is placed between the middle plate 216 and the membrane-electrode assembly, and is formed with a channel to guide the flux of the fuel supplied through the holes of the middle plate 216. The cathode collector 215 is placed on the membrane-electrode assembly facing the anode collector, with the membrane-electrode assembly therebetween. Further, the cathode collector 215 includes an opening 215a through which the cathodes 213a and 213b are exposed.

The pair of end plates 218 is placed on the cathode collectors 215 facing each other leaving the middle plate 216 and the membrane-electrode assembly therebetween. The pair of end plates 218 is coupled by the coupling means providing a predetermined coupling pressure. The wiring line 219 electrically connects the anode collector 214 and the cathode collector 215 of each membrane-electrode assembly outside of the fuel cell main body 210.

Figure 10A:
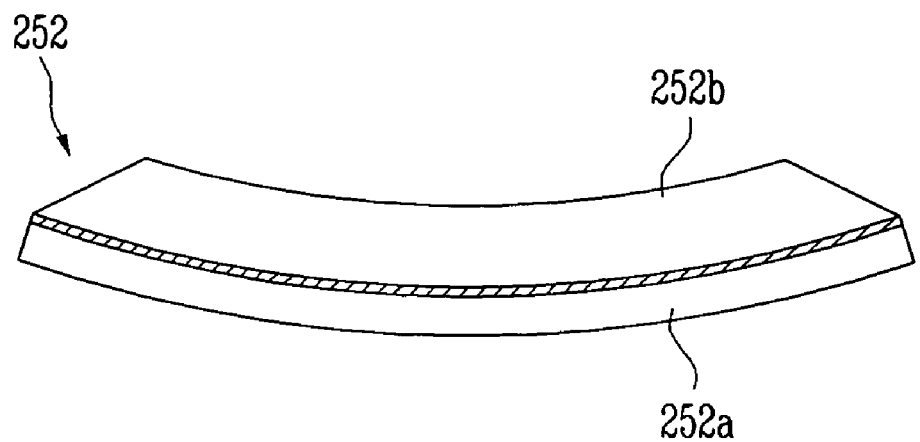
FIG. 10A is a perspective view of a concentration sensor employed in the direct methanol fuel cell system according to an embodiment of the present invention.
Figure 10B:
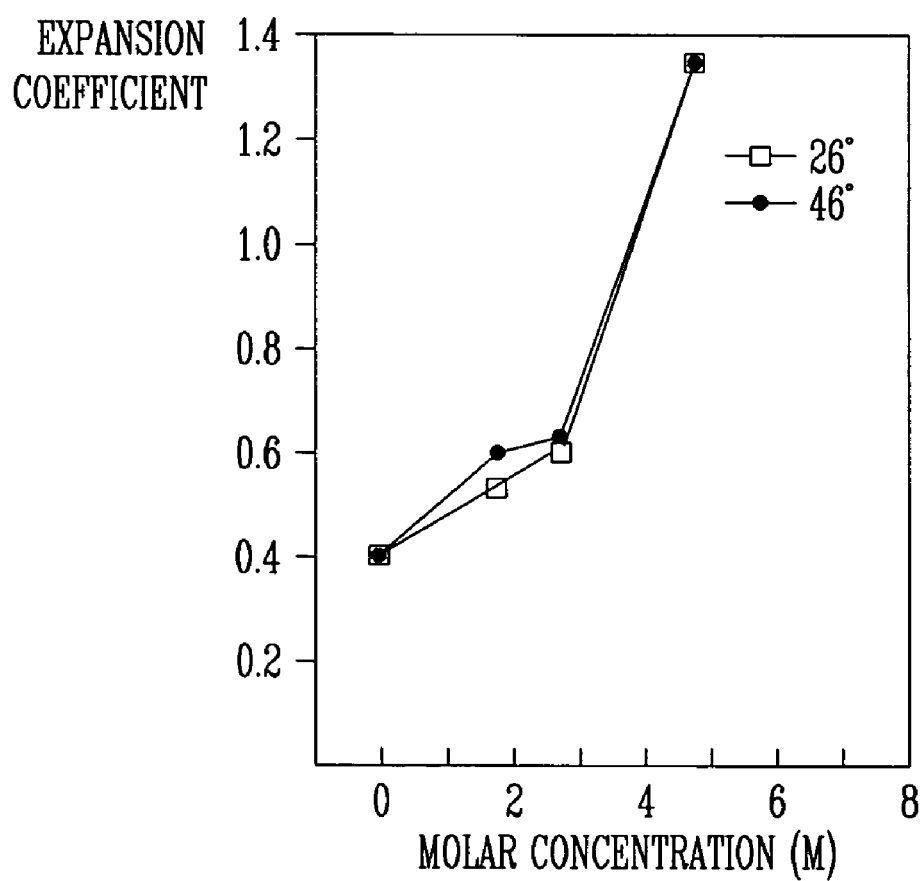
FIG. 10B is a graph showing an expansion coefficient of the concentration sensor of FIG. 10A according to molar concentration and temperature.

FIG. 10A is a perspective view of a concentration sensor employed in the direct methanol fuel cell system according to the present invention, and FIG. 10B is a graph showing an expansion coefficient of the concentration sensor according to molar concentration and temperature.

Referring to FIG. 10A, the concentration sensor 252 according to an embodiment of the present invention includes a substrate 252b and a pressure film 252a attached to one surface of the substrate 252b. The pressure film 252a is varied in its volume according to the molar concentration of the fuel in a place where the concentration sensor 252 is positioned.

The concentration sensor 252 can include an ion conduction polymer resin or a compounded resin, of which the volume is varied according to the concentration of the fuel, e.g., methanol. For instance, in one embodiment, the pressure film 252a used for the concentration sensor 252 of the DMFC system includes perfluorinated ion exchange resin, e.g., Nafion of DuPont.

In this embodiment, the pressure film 252a of the concentration sensor 252 is manufactured with Nafion-115, and its expansion coefficient is measured according to the molar concentration of the methanol solution at temperatures of 26° C. and 46° C. As shown in FIG. 10B, the expansion coefficient of the manufactured concentration sensor 252 increases in direct proportion to the molar concentration under the same temperature condition. Further, between the molar concentrations of 1 M and 3 M, the expansion coefficient of the concentration sensor 252 in the case of 46° C. is a little higher than that of 26° C.

As described above, according to the above described embodiments of the present invention, the concentration of the mixed fuel remaining in the anode of the fuel cell main body when the system stops operating is decreased to a desired concentration or below, so that the activity deterioration of the metal catalyst and damage to the electrolyte membrane are prevented. Further, the performance of the system is not lowered when it restarts operating, and the reliability of the system is enhanced, so that the lifespan of the fuel cell main body and the system is increased.

Although various embodiments of the present invention have been shown and described, it would be appreciated by those skilled in the art that changes might be made to these embodiments without departing from the principles and spirit of the invention, the scope of which is defined in the claims and their equivalents.

What is claimed is:

1. A direct methanol fuel cell system comprising:
a fuel cell main body including at least one membrane-electrode assembly having an electrolyte membrane, and an anode and a cathode positioned on opposite sides of the electrolyte membrane;
a fuel-supplying unit feeding a mixing tank with high concentration fuel;
the mixing tank mixing and/or storing the fuel fed from the fuel-supplying unit and an outlet stream discharged from the fuel cell main body;
a fuel feeder supplying mixed fuel stored in the mixing tank to the fuel cell main body; and
a controller configured to control the fuel-supplying unit to stop operating in response to a stop request signal, to control the fuel feeder to circulate the mixed fuel via the anode of the fuel cell main body, and to stop circulation when a fuel concentration of the mixed fuel is less than or equal to a reference concentration.

2. The direct methanol fuel cell system according to claim 1, wherein the mixed fuel is a methanol solution, and the reference concentration ranges from 0 to 0.3 M.

3. The direct methanol fuel cell system according to claim 1, further comprising a concentration sensor to detect the fuel concentration of the mixed fuel.

4. The direct methanol fuel cell system according to claim 1, further comprising a timer that is set to operate for a time taken to lower the fuel concentration of the mixed fuel to less than or equal to the reference concentration, the timer stopping the fuel feeder when the timer stops operating.

5. The direct methanol fuel cell system according to claim 4, wherein the timer operates in response to the stop request signal.

6. The direct methanol fuel cell system according to claim 1, further comprising a soft switch type stop button generating the stop request signal, wherein the controller is adapted to receive the stop request signal from the soft switch type stop button and to control the fuel-supplying unit to stop operating in response to the stop request signal.

7. The direct methanol fuel cell system according to claim 6, wherein the soft switch type stop button is coupled to an external load.

8. The direct methanol fuel cell system according to claim 1, wherein the at least one membrane-electrode assembly is a plurality of membrane-electrode assemblies, and wherein the fuel cell main body comprises a separator electrically connecting the plurality of membrane-electrode assemblies in series and defining a channel allowing a fluid flow.

9. The direct methanol fuel cell system according to claim 8, further comprising an oxidant-supplying unit to feed the fuel cell main body with an oxidant,
wherein the controller controls the oxidant-supplying unit to stop operating at or after a time when the fuel feeder stops operating.

10. The direct methanol fuel cell system according to claim 1, wherein the fuel cell main body employs air contacting the cathode as an oxidant.

11. The direct methanol fuel cell system according to claim 1, further comprising an electricity storage device electrically connected to the fuel cell main body, the fuel-supplying unit, the fuel feeder, and the controller.

12. The direct methanol fuel cell system according to claim 11, wherein the controller controls the electricity storage device to be charged with electricity generated in the fuel cell main body.

13. The direct methanol fuel cell system according to claim 12, further comprising a switching unit electrically disconnecting an external load from the fuel cell main body, and electrically connecting the electricity storage device with the fuel cell main body.

14. The direct methanol fuel cell system according to claim 1, the outlet stream includes unreacted fuel and/or water.

* * * * *